United States Patent [19]
Yoshikawa et al.

[11] Patent Number: 6,106,907
[45] Date of Patent: Aug. 22, 2000

[54] ELECTRODE PLATE, LIQUID CRYSTAL DEVICE AND PRODUCTION THEREOF

[75] Inventors: Toshiaki Yoshikawa, Yokohama; Makoto Kameyama, Funabashi; Junri Ishikura, Tokyo, all of Japan

[73] Assignee: Canon Kabushiki Kaisha, Tokyo, Japan

[21] Appl. No.: 08/879,605

[22] Filed: Jun. 20, 1997

[30] Foreign Application Priority Data

Jun. 25, 1996 [JP] Japan .................................. 8-164873
Jul. 19, 1996 [JP] Japan .................................. 8-191125

[51] Int. Cl.$^7$ ................................................ G02F 1/1343
[52] U.S. Cl. .......................... 428/1.1; 349/139; 349/147; 349/148
[58] Field of Search ........................... 428/1.1, 622, 623, 428/626, 630, 675, 209, 210, 433; 349/139, 148, 147

[56] References Cited

U.S. PATENT DOCUMENTS

| | | | |
|---|---|---|---|
| 3,857,683 | 12/1974 | Castonguay | 29/195 |
| 4,127,321 | 11/1978 | Koyama et al. | 350/336 |
| 4,190,474 | 2/1980 | Berdan et al. | 428/626 |
| 4,483,906 | 11/1984 | Nakatsugawa | 428/607 |
| 4,543,573 | 9/1985 | Fuyama et al. | 340/781 |
| 5,448,037 | 9/1995 | Takase et al. | 219/547 |
| 5,650,834 | 7/1997 | Nakagawa et al. | 349/139 |
| 5,694,188 | 12/1997 | Sano et al. | 349/139 |

FOREIGN PATENT DOCUMENTS 97-53665 7/1997 Rep. of Korea .

OTHER PUBLICATIONS

U.S. application No. 08/814,318, Kameyama et al., filed Mar. 1997.
U.S. application No. 08/899,057, Ishikura et al., filed Jul. 1997.

Primary Examiner—John J. Zimmerman
Attorney, Agent, or Firm—Fitzpatrick, Cella, Harper & Scinto

[57] ABSTRACT

An electrode plate is formed by a substrate and a plurality of patterned electrodes formed on the substrate. Each patterned electrode has a laminate structure including a first layer of nickel metal formed on the substrate and a second layer of copper formed thereon. The electrode plate may be prepared by a process including a step of etching such a multilayer metal electrode-forming film formed on a substrate by spraying an etchant downwardly and uniformly onto the substrate while rotating the substrate at a rotation speed sufficient to allow quick liberation of the etchant from the substrate. The metal electrodes can be formed with a good adhesion onto the substrate and with good accuracies of width and thickness. By incorporating the electrode plate as a pair of substrates sandwiching a liquid crystal, a liquid crystal device showing free from transmission delay and rounding of voltage waveforms can be provided.

9 Claims, 11 Drawing Sheets

ELECTRODE PLATE, LIQUID CRYSTAL DEVICE AND PRODUCTION THEREOF

FIELD OF THE INVENTION AND RELATED ART

The present invention relates to an electrode plate comprising electrodes formed on a substrate, a process for production thereof, a liquid crystal device and a process for production thereof. The present invention also relates to a method and an apparatus for spin etching.

Liquid crystal devices of TN (twisted nematic) type, STN (super twisted nematic) type, etc., have conventionally adopted electrode plates comprising ITO (indium tin oxide) films, etc., as transparent electrodes formed on glass substrates in many cases.

The above-mentioned conventional transparent electrode (ITO) has a relatively large resistivity so that it is liable to cause a problem of delay in transmission of applied voltage waveforms according to recent demands for a larger display size and a higher resolution. Particularly, in a liquid crystal device using a ferroelectric liquid crystal requiring a smaller substrate gap or liquid crystal layer thickness on the order of 1.0–2.0 μm, the transmission delay of applied voltage waveform is liable to be noticeable. A reduced resistance may be given by use of a thicker transparent electrode but such a transparent electrode having an increased thickness is liable to exhibit a poor adhesion onto a glass substrate and require a longer time for the film formation, thus resulting in an increased production cost.

In order to solve these problems, there has been proposed a liquid crystal device quipped with an electrode plate comprising a glass substrate having thereon low-resistivity metal electrodes of aluminum, etc., and thereon transparent electrodes of ITO, etc., electrically contacting the metal electrodes. Further, in order to comply with demands for liquid crystal device with a higher aperture ratio and a high-speed responsiveness in recent years, it has been desired to develop a metal electrode material of a further lower resistivity.

In case of using metal electrodes of copper having a lower resistivity than aluminum, it is possible to realize a higher aperture ratio and a higher-speed responsiveness, but problems are liable to occur regarding an adhesion between a glass substrate and a copper electrode layer and a corrosion characteristic of copper. As a solution to such problems, there has been proposed an electrode plate having a sectional structure as shown in FIG. 17 including a glass substrate 100 having thereon an adhesion layer 101 of chromium, a principal conductor layer 102 of copper and thereon a chromium-copper alloy layer 103 formed by sintering in a reducing atmosphere. The adhesion layer 101 and the principal conductor layer 102 may be formed by forming a chromium layer and a copper layer respectively by sputtering on the glass substrate, followed by etching in a prescribed electrode pattern.

In case of providing ordinary print circuit boards, the etching of copper layer may be performed by using an iron chloride solution, a copper chloride solution or a mixture acid liquid principally comprising nitric acid and phosphoric acid as an etchant (or etching liquid), and dipping a substrate coated with a copper layer together with an etching pattern in a vessel of the etchant or showering the etchant onto the substrate to etch the copper layer into a desired pattern.

However, in the electrode plate structure shown in FIG. 17 including a glass substrate 100 and a laminate film disposed thereon comprising a copper principal conductor layer 102 and a chromium adhesion layer 101 for enhancing the adhesion between the copper layer 102 and the glass substrate 100, the chromium layer 101 and the copper layer 102 cannot be patterned in a single etching step. More specifically, when an etchant as described above having an etching effect on both the chromium and copper layers is used for etching of the laminate layer, a cell effect occurs between the chromium and copper layers via the etchant. As a result, the layer of chromium (similarly as molybdenum and titanium) having a larger ionization tendency (i.e., a smaller standard electrode potential) than copper is selectively etched to result in an abnormal undercut. The undercut may remain within a tolerable limit for an electrode or wire pattern having a width on the order of mm as in ordinary print circuit boards, but provides a serious problem for providing an electrode or wire pattern having a width on the order of 10 μm. Thus, the undercut can lead to peeling of the laminate electrode pattern.

For the above reason, it is necessary to use an etchant reacting only on the adhesion layer metal and an etchant reacting only on copper and repeat the etching of the respective metal layers while changing the etchant. More specifically, in the case of providing a chromium adhesion layer, it is possible to effect selective etching of the chromium and copper layers in multiple steps by using etchants selectively reacting on chromium and copper, but this requires a complicated process and a considerable processing time. Moreover, the chromium-containing etching waste liquid can provide another difficulty regarding an environmental pollution problem.

On the other hand, in the case of providing an adhesion layer of molybdenum or titanium, most etchants reactive with these metals are also reactive with copper and also cause the undercut problem. Incidentally, the use of a potassium ferricyanide solution allows selective etching of molybdenum but simultaneously promotes the growth of a stable oxide film on copper. The oxide film functions as a passivation film against a copper chloride solution as a selective etchant for copper, thus preventing the copper etching. An acid solution containing nitric acid, etc., can effect etching of a copper layer coated with the oxide film, but this is also accompanied with the problem of undercut arising from the difference in ionization tendency.

On the other hand, in the dry etching process, such as the reactive etching process, etc., the above-mentioned problems arising from the difference in ionization tendency can be obviated, but the etching speed is too small for commercial application.

As another process for providing a patterned copper film without resorting to an etching process, it has been proposed to form an adhesion layer film of chromium, molybdenum, etc., by sputtering, followed by etching into an electrode pattern, and selectively coat the patterned adhesive layer with copper by plating and also with a protective layer by plating, etc. This process obviates most of practical problems mentioned above accompanying the copper electrode production, but it is difficult to form an accurate film thickness on the order of μm as required on an electrode plate for a liquid crystal device. Further, the adhesion layer formed by sputtering on the glass substrate shows a good adhesion onto the glass substrate but shows a rather poor adhesion with a copper plating layer, thus possibly requiring another adhesion promoting layer between the adhesion layer and the copper layer.

From the above discussion, it is still desirable to provide an electrode plate with patterned electrodes by sequentially forming an adhesive layer and a copper layer on a substrate and then etch the layers in a prescribed electrode or wire pattern. In this instance, it is desired to effect simultaneous etching of the adhesive layer and the copper layer in a single etching step.

On the other hand, the wet etching process has been frequently used as an etching process for locally removing or patterning a film formed on a substrate not only for production of semiconductor devices and ornamental articles, because of a simple structure and a low production cost.

FIG. 11 is an illustration of such a wet etching process. Referring to FIG. 11, in this process, a vessel 81, such as a beaker, is charged with an etchant 82, in which a substrate 84 having thereon a pattern of resist 83 exposing portions to be etched is dipped for a prescribed period. After the prescribed time, the substrate 84 is taken out and washed with, e.g., a large amount of flowing water to terminate the etching. In this way, a film on a substrate can be etched into various patterns through a simple step according to the wet etching process.

In the wet etching process, however, there is sometimes encountered with a difficulty that the etching speed can locally vary on the substrate depending on an affinity between an etchant and a film to be etched. For example, the etching of an aluminum (Al) film may generally be performed by using a liquid mixture of nitric acid, phosphoric acid and acetic acid (which may sometimes be called mixture acid aluminum liquid) and, in that case, the central portion of the film on the substrate is preferentially etched because of a difference in etching speed between the central portion and the edge portion on the substrate. On the other hand, the etching of a copper (Cu) film may frequently be performed by using a liquid mixture of ferric chloride and acetic acid. The mixture liquid provides a larger etching speed at an edge portion than a central portion of the Cu film on the substrate, thus causing a preferential etching at the edge portion.

Further, as the wet etching process is proceeded isotropically by way of a chemical reaction between the film and the etchant, thus being liable to cause a side etching phenomenon as shown at 90 in FIG. 12 (showing a side view of an etched film portion) that a portion below a resist 83 of a Cu film formed on a substrate 86 of, e.g., glass, is etched hemispherically. Because of the side etching, it becomes difficult to effect the etching of a minute pattern on a micron order.

In order to obviate such difficulties of the etching speed distribution and the side etching, there has been proposed a wet etching process utilizing a showering scheme (wherein the etchant is showered onto a substrate). As a result, it has become possible to effect the etching of a pattern of several $\mu$m, so that the showering process has been frequently used, particularly in an early period of semiconductor device production.

FIG. 13 illustrates such a showering-scheme wet etching process. Referring to FIG. 13, an etchant 88 is showered from a number of nozzles 87, and a substrate 84 to be etched is caused to proceed under the shower of the etchant 88. As a result, the etchant 88 can be uniformly supplied to the entire area of the substrate 84 surface and the uniform etching over the entire surface becomes possible.

Further, in the showering-scheme process, the etchant 88 may be sprayed with a certain degree of directionality onto the substrate 89 surface, the amount of side etching 90 can be reduced as shown in FIG. 14 (compared with a conventional state shown in FIG. 12 described above), so that it can provide an etching pattern showing a higher aspect ratio.

On the other hand, in the production of semiconductor devices, a dry etching process has become popular because of a high-accuracy controllability and occurrence of less waste liquid in addition to the above-described demands for patterning of a laminate film of different materials and an etching pattern giving a high aspect ratio.

In the dry etching process, a film on a substrate is vaporized through a plasma reaction with a reactive gas to remove the film from the substrate. The dry etching process requires a reaction vessel to be placed under vacuum and a huge etching apparatus for processing of a substrate having a diameter of several tens cm. Accordingly, this process cannot be readily applicable to a larger size liquid crystal substrate required corresponding to demand for larger size liquid crystal panels in recent years.

In semiconductor device production in recent years, the use of Cu films has been examined for providing lower-resistivity electrodes or wires, but no reactive gases for providing a vaporizable copper compound have been discovered so that the dry etching process has not been successfully adopted. Further, the dry etching process is accompanied with a problem that the substrate is liable to be damaged due to irradiation with charged particles.

For obviating the difficulties of the dry etching process, the wet etching process is again receiving better evaluation in recent years. Further, the problem of side etching which has been regarded as a defect of the conventional wet etching process can be solved by formation of a side wall protective film, thus allowing etching of a higher aspect ratio.

FIG. 15 illustrates a principle of the side wall protection film. A Cu etching process is explained for example. A mixture aqueous solution of ferric chloride and acetic oxide is generally used as the etchant, and ca. 1% of thiourea is added thereto. The etchant is sprayed onto a substrate 84 surface. As a result, a reaction according to the following formula (1) is caused at the Cu film 85 surface to form a deposition of insoluble matter 89, which inhibits the etching:

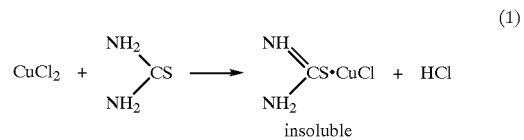

(1)

As shown in FIG. 15, the etchant 88 is sprayed onto the substrate 84 surface so that the bottom portion rather than the side wall portion of the Cu film 85 is preferentially eroded to provide a larger etching speed in a downward direction, thereby allowing a higher aspect ratio of etching than before.

On the other hand, known etching apparatus include one wherein an etchant is sprayed onto a rotating substrate to be etched, and the showing scheme can be adopted for providing a better controllability.

FIG. 16 illustrates such a spin coating apparatus adopting the showering scheme. Referring to FIG. 16, in the apparatus, a substrate 91 to be etched held on a rotating substrate holder 90 is rotated together with the holder 90. After the rotation of the holder 90 is stabilized, a nozzle 92 disposed above the substrate 91 is vibrated, and a changeover value 93 is turned on to open an etchant pipe 94, thus spraying the etchant through a nozzle 92 onto the substrate 91 surface.

After the etching for a prescribed period, the changeover valve 93 is switched to stop the etchant and open a pipe 95 for a rinse such as water, thus spraying the rinse onto the substrate 91 surface to wash out the etchant 94. The substrate rotation speed and the vibration speed of the nozzle during the etching may be appropriately be adjusted depending on a combination of the etchant and the film to be etched.

In such a spin etching process wherein an etchant supplied to a substrate surface is liberated from the substrate due to a centrifugal force accompanying the substrate rotation, there are attained several advantages for providing an improved etching accuracy not attainable by the conventional wet etching process, such that a fresh etchant is less liable to be buffered with the etchant after the reaction, the etchant can be supplied over the entire substrate by an appropriately adjusted combination of the substrate rotation speed and the nozzle vibration frequency, and the etching time can be controlled at an improved accuracy by shortening the distance between the etchant discharge nozzle and the etchant selection valve.

However, one difficulty with the spin etching process is that the etching termination point determination accuracy is inferior than the dry etching process.

More specifically, in the dry etching process using a plasma reaction for etching, the reaction of the film on the substrate for gassification is accompanied with light emission in many cases, and the resultant emission spectrum is peculiar to the film material and the etching gas. Accordingly, by specifying a light emission spectrum and measuring an intensity change of the spectrum, it is possible to accurately evaluate the progression state of the etching.

In contrast thereto, in the wet etching process, no noticeable phenomenon like light emission is involved. Accordingly, the progression of the etching has been evaluated according to an etching time experimentally determined based on trial experiments performed in advance. However, the evaluation of the progression state according to the etching time requires an accurate stabilization of reaction speed as a critical factor so that it also becomes necessary to accurately control the etchant and the temperature of the substrate to be etched.

In this regard, a large amount of etchant is used in the wet etching process and, in order to suppress the etching cost and minimize the environmental pollution, it has been generally practiced to recover the etchant and repeatedly use the etchant. However, during such repeated use of the etchant, the etching speed can be lowered due to saturation of a reaction called "etchant fatigue", or the vaporization of a relatively volatile component in the case of an etchant comprising a mixture of several components causes a compositional change of the etchant which can even lead to an increase in etching speed.

Thus, even if the etchant and the substrate temperature are tried to be accurately controlled so as to provide an accurately stabilized reaction speed, it becomes difficult to effect a stable etching control at a good reproducibility due to factors, such as the etchant fatigue, and also evaluate the progression state of etching at a good accuracy.

SUMMARY OF THE INVENTION

Accordingly, an object of the present invention is to provide an electrode plate having thereon an electrode laminate of a metal adhesion layer and a principal conductor layer of copper which can be patterned at a high accuracy through a single etching step, a process for producing such an electrode plate, a liquid crystal device equipped with such an electrode plate, and also a process for producing such a liquid crystal device.

Another object of the present invention is to provide a process and an apparatus for spin etching allowing accurate determination or evaluation of a progression state of etching.

According to the present invention, there is provided an electrode plate, comprising: a substrate and a plurality of patterned electrodes formed on the substrate, wherein each patterned electrode has a laminate structure including a first layer of nickel metal formed on the substrate and a second layer of copper formed on the first layer.

According to the present invention, there is provided a process for producing an electrode plate, sequentially comprising:

a first layer-forming step of forming a first layer of nickel metal on a substrate, a second layer-forming step of forming a second layer of copper on the first layer, and an etching step of spraying an etchant downwardly onto the first and second layers on the substrate while rotating the substrate, thereby etching the first and second layers in a prescribed pattern to form a plurality of laminated metal electrodes.

According to another aspect of the present invention, there is also provided a spin etching process, comprising the steps of fixing a substrate to be etched onto a substrate holder, and spraying an etchant onto the substrate while rotating the substrate holder to etch a surface of the substrate, wherein a progression state of etching is monitored by illuminating the substrate with light, detecting a light quantity or a spectrum pattern of emitted light as reflected light or transmitted light from the substrate, and evaluating the detected emitted light from the substrate.

These and other objects features and advantages of the present invention will become more apparent upon a consideration of the following description of the preferred embodiments of the present invention taken in conjunction with the accompanying drawings.

DESCRIPTION OF THE PREFERRED EMBODIMENTS

Figure 1:
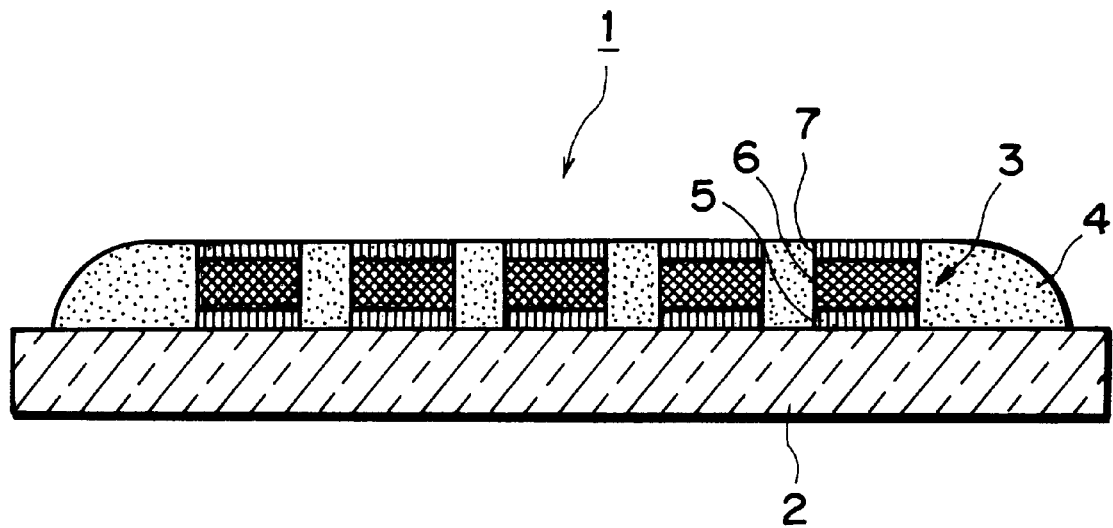
FIG. 1 is a schematic sectional view of an embodiment of the electrode plate according to the invention.

In a preferred embodiment of the electrode plate according to a first aspect of the present invention, between a principal conductor layer of copper constituting a patterned electrode and a glass substrate, a layer of nickel metal is inserted as an adhesive layer for providing an enhanced adhesion between the copper layer and the glass substrate. Herein, "nickel metal" is used as a term including a single substance of nickel (Ni) and an alloy of nickel (Ni) in an amount of preferably at least 70% (atm. %) with another element preferably up to 30% (atm. %). Preferred examples of another embodiment may include molybdenum (Mo), aluminum (Al), silicon (Si) and tin (Sn). A nickel alloy is preferred so as to provide a substantially non-magnetic or non-magnetizable metal allowing effective utilization of the DC magnetron sputtering process for film formation compared with nickel single substrate which is a magnetic material (having a saturation magnetization of ca. 600 G. For this purpose, it is preferred to use a nickel alloy containing any one of molybdenum ($\geq$7%), aluminum ($\geq$17%), silicon ($\geq$13%) and tin ($\geq$15%) in an amount sufficient to provide a substantially non-magnetic nickel alloy having a saturation magnetization of at most 1000 G so as to allow the DC magnetron discharge providing an improved film formation speed.

For etching a laminate metal film to provide patterned metal electrodes, it is preferred to use an aqueous solution of iron chloride (principally ferric chloride but capable of containing ferrous chloride) as an etchant (i.e., etching liquid). A nickel metal provides a practical etching speed in an iron chloride solution at a high concentration of ca. 30% (wt. %) but the etching is liable to be ununiform. On the other hand, the nickel metal shows only a practically unacceptable low etching speed in an iron chloride at a low concentration of 10% or below. According to our experiments, it has been found that a nickel metal film laminated with a copper film can show a practical etching speed can show a practical etching speed in an iron chloride solution at a low concentration of at most 10%. It has been also found that the copper film laminated with the nickel metal fill shows an increased etching speed. More specifically, the following Table 1 shows etching speed ($Å$/sec) measured with respect to various films when etched with a low concentration (9%) of ferric chloride solution, including films of copper single substance (Cu), nickel single substance (Ni), nickel alloys (Ni—Mo (10%), Ni—Al (20%), Ni—Si (15%), Ni—Sn (20%)), each in a thickness of 300 $Å$, and a three layer laminate film (Ni—Mo (8%) alloy/cu/Ni—Mo (8%) alloy) in a total thickness of 10450 $Å$ (=300+10000+150).

TABLE 1

| Film | Cu | Ni | Ni—Mo | Ni—Mo/ Cu/Ni—Mo | Ni—Al | Ni—Si | Ni—Sn |
|---|---|---|---|---|---|---|---|
| Etching speed ($Å$/sec) | 217 | 17 | 3 | 583 | 5 | 4 | 5 |

The etching speed of the three-layer (Ni—Mo/Cu/Ni—Mo) film was obtained by dividing the total film thickness with a required time for etching the entire film.

It is known that the etching of a copper layer film on a substrate always proceeds from a substrate edge to a central portion of the substrate. According to our experiments of etching a copper laminate film as descried above, the film portions at the center and the edge on the substrate showed a remarkable difference in etching speed. More specifically, in an experiment of etching a three-layer film on a 20 mm-square substrate, when the etching of a central portion of the film did not substantially proceed, the edge portions lost both nickel and copper due to over etching, thus exhibiting a remarkable non-uniformity of etching speed.

Such an etching irregularity can be removed according to a preferred embodiment of the present invention by rotating a substrate carrying a laminate metal film to be etched at a high speed of 200–1000 rpm and uniformly showing an etchant of iron chloride solution onto an entire surface of the rotating substrate. As a result, the etchant sprayed onto the substrate is quickly liberated from the substrate due to a centrifugal force caused by the high-speed rotation of the substrate. Thus, the etchant in fine droplets reaches the substrate surface to initiate the etching reaction but is soon liberated from the substrate to terminate the etching reaction. Accordingly, by uniformly dispersing the etchant over the entire surface of the substrate, the etching proceeds at the respective parts on the substrate, thus eliminating an etching speed difference between the edge portion and the central portion on the substrate.

In this way, according to the present invention, by a combination of a laminate film and a manner of etching as described above, it has become possible to form patterned metal electrodes comprising a laminate of a nickel metal and copper in a width of μm order on a large substrate of, e.g., 300×340 mm, which has been regarded as impossible heretofore.

Hereinbelow, some preferred embodiments will be described with reference to drawings.

Figure 2:
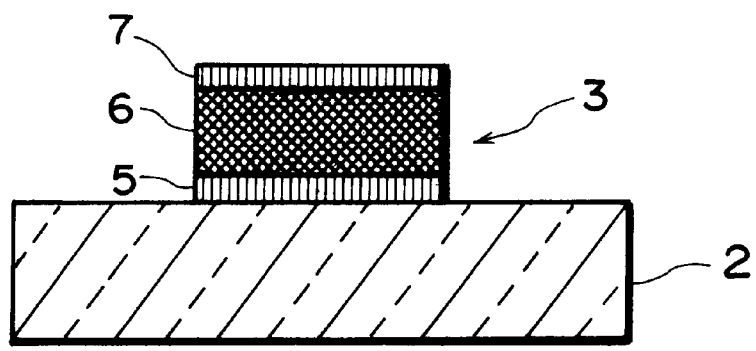
FIG. 2 is an enlarged sectional view of a laminate metal electrode on a substrate in the electrode plate shown in FIG. 1.

FIG. 1 is a schematic sectional view of a preferred embodiment of the electrode plate according to the present invention. Referring to FIG. 1, an electrode plate 1 comprises a glass substrate 2 on which patterned metal electrodes 3 are formed in a prescribed electrode pattern and a UV (ultraviolet ray)-cured resin is disposed to fill the spacings between the metal electrodes 3. As shown in a partially enlarged view of FIG. 2, each patterned metal electrode 3 has a laminate structure including an adhesion layer 5 (of, e.g., 15–50 nm in thickness), a principal conductor layer 6 of copper (of, e.g., 100 nm–2 μm in thickness) and a protective layer 7 (of, e.g., 12–100 nm in thickness) formed in this order from the glass substrate 2 side. The adhesive layer 5 and the protective layer 7 may respectively be formed of a nickel metal, preferably a nickel alloy, as described above.

By forming the adhesion layer 5 and the protective layer 7 of the metal electrode 3 with a nickel metal, the glass substrate 2 and the principal conduction layer 6 of copper which show a poor adhesion therebetween can be laminate with a good adhesion by the adhesion layer 5 disposed therebetween. The adhesion layer 5 and the protective layer may preferably be formed of a nickel alloy so as to have a saturation magnetization of at most 1000 G (=gauss), thereby allowing the formation thereof by utilizing the DC magnetron sputtering process.

Such an electrode plate 1 may be produced through a process as described below with reference to FIGS. 3 to 6.

Figure 3A:
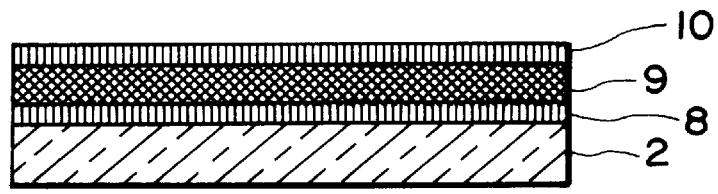
FIGS. 3A–3C illustrate sequential steps involved in an embodiment of the process for producing an electrode plate according to the invention, including FIG. 3A for illustrating steps for forming a nickel-molybdenum alloy layer, a copper layer and a nickel-molybdenum alloy layer, FIG. 3B for illustrating a photoresist exposure step, and FIG. 3C for illustrating a metal electrode etching pattern.

First of all, a glass substrate 2 is coated with adhesion layer 8 of nickel alloy, then with an principal conductor layer 9 of copper and then with an protective layer 10 of a nickel alloy, respectively by the DC magnetron sputtering process (FIG. 3A).

Figure 3B:
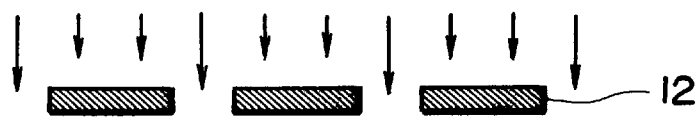
Figure 3B:
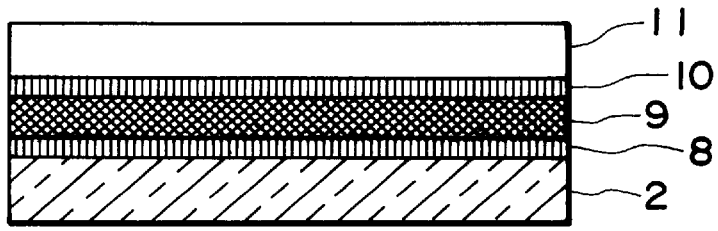
Figure 3C:
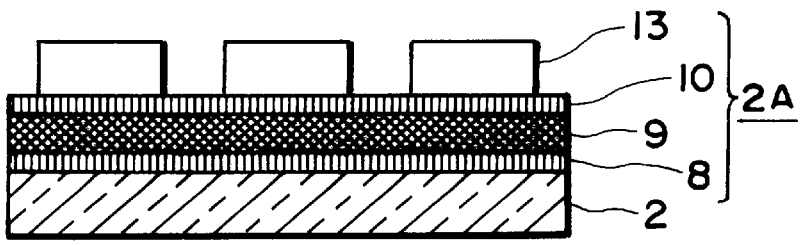

Then, a photoresist is applied onto the glass substrate 2 carrying the metal layers 8–10 by spin coating to form a photoresist layer 11, which is then exposed through a photomask 12 carrying an electrode pattern, developed and post-baked to form an etching pattern 13 (FIGS. 3B and 3C).

Figure 4:
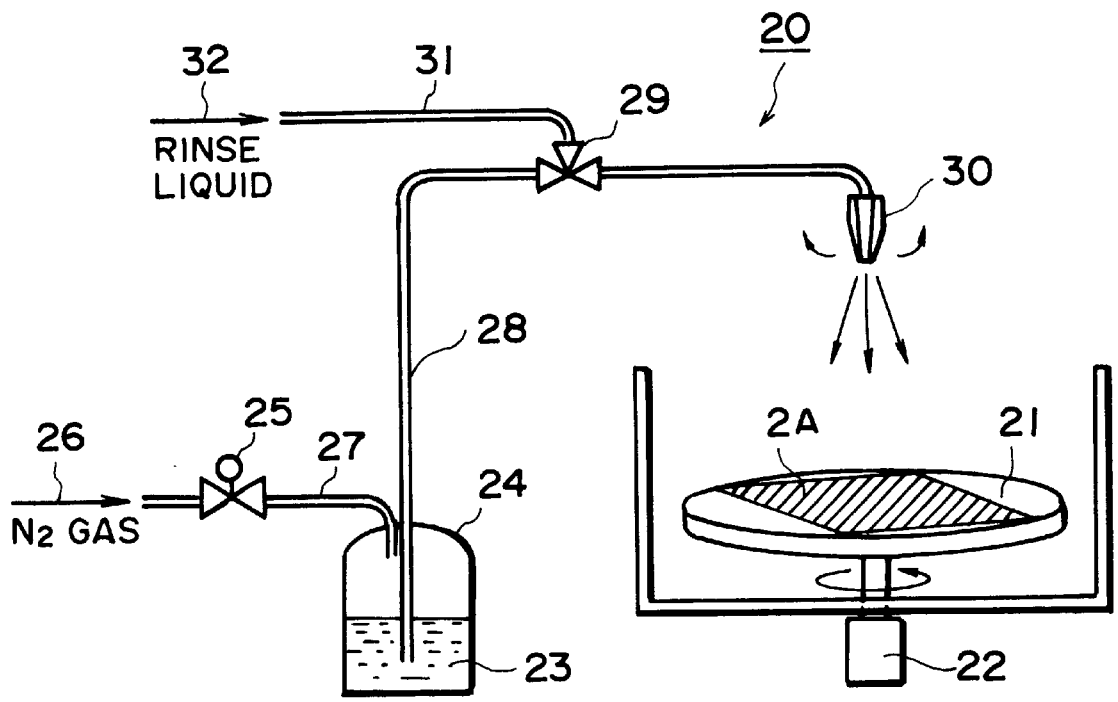
FIG. 4 is an illustration of a spin etching apparatus.

Then, the metal layers 8–10 laminated on the glass substrate 2 may be etched by using an etching apparatus 20 as shown in FIG. 4.

Referring to FIG. 4, the coated substrate 2A having a laminate structure as shown in FIG. 3C is first fixed onto a rotatable substrate holder 21 axially connected with a drive motor 22. By operating the motor 22, the substrate holder 21 carrying the coated substrate 2A is rotated at a high speed of ca. 200–1000 rpm, preferably 400–500 rpm in view of the durability of the apparatus 20.

Then, a pressure vessel 24 containing a ferric chloride aqueous solution 23 as an etchant is pressurized by supplying a nitrogen (N₂) gas 26 through a pipe 26 under a pressure controlled by a controlled valve 25 to supply the ferric chloride solution in the vessel 24 through a three-way valve 29 to a nozzle 30 disposed above the substrate holder 21 and spray the ferric chloride solution onto the rotating coated substrate 2A. The nozzle 30 is equipped with a rocking means (not shown) and is linearly reciprocally rocked in directions of upper two arrows (as shown) to shower the etchant in a spread form uniformly onto the entire surface of the coated substrate 2A. As a result, the laminate layers including the nickel alloy layers 8, 10 and the copper layer 9 are etched at a practically feasible speed as shown in Table 1 described above.

After a prescribed etching time, the three-way valve 29 is switched to terminate the supply of the etchant and spray a rinse (pure water) 32 through a pipe 31 and the nozzle 30 onto the coated substrate 2A to terminate the etching. After sufficiently washing the coated and etched substrate 2A with pure water 32, the supply of the rinse 32 is terminated and the substrate 2A is further rotated for a while for releasing the rinse to finish the etching treatment.

Figure 5:
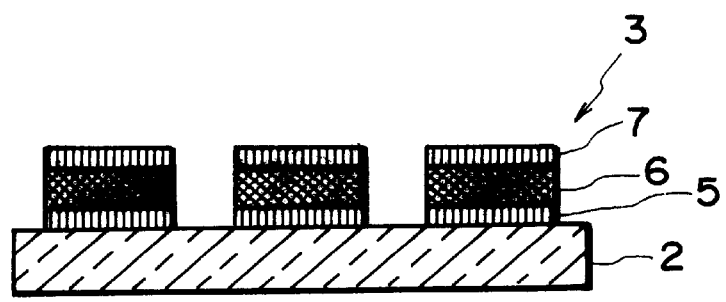
FIG. 5 is a schematic sectional view showing patterned electrodes formed after the etching.
Figure 6A:
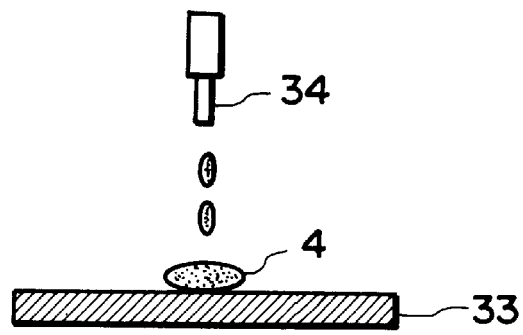
FIGS. 6A–6E are schematic sectional views or side illustrations for illustrating several steps involved in an embodiment of the process for producing an electrode plate according to the invention, including FIG. 6A showing a state where a UV-curable resin is dripped on a smoothing plate, FIG. 6B showing a state wherein an electrode plate provided with metal electrodes is caused to contact the smoothing plate carrying a dripped UV-curable resin, FIG. 6C showing a state where the UV-curable resin embedded between the metal electrodes on a glass substrate, FIG. 6D showing a state where the UV-curable resin is cured under exposure to UV-light, and FIG. 6C showing a state of an electrode plate carrying a metal electrodes and a UV-cured resin filling therebetween from which the smoothing plate has been removed.
Figure 6B:
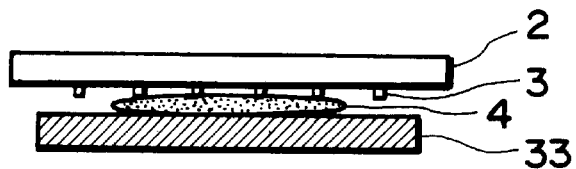
Figure 6C:
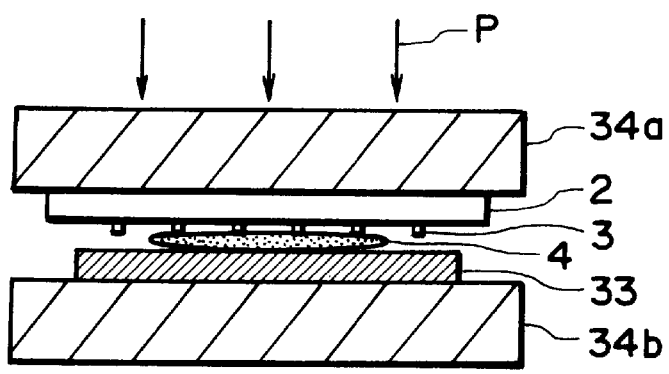
Figure 6D:
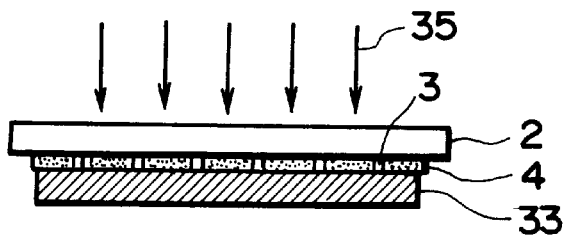
Figure 6E:

Then, the etching pattern 13 is peeled from the coated and etched substrate to form an electrode plate having a sectional structure as shown in FIG. 5 including a glass substrate 2 and patterned metal electrodes 3 of a laminate structure including an adhesion layer 5 of nickel alloy, a principal conductor layer 6 of copper and a protective layer 7 of nickel alloy.

Then, on a surface of a smooth plate 33, a prescribed amount of UV-curable resin 4 is dripped by a dispenser 34 (FIG. 6). On the smoothing substrate 33 carrying the dripped UV-curable resin, the above-prepared electrode plate having a sectional structure shown in FIG. 5 is superposed so as to sandwich the UV-curable resin 4 with the surface of the metal electrodes 3 (FIG. 6B).

Then, the superposed products including the smoothing plate 33 and the glass substrate 2 sandwiching the UV-curable resin 4 is placed between an upper plate 34a and a lower plate 34b of a press machine and supplied with a pressure P over the entire area to cause the smoothing plate 4 and the glass substrate 2 to intimately contact each other with the UV-curable resin 4 remaining as a very thin layer while exuding an excess of the UV-curable resin out of the spacing between the substrate 2 and the smoothing plate 33.

Then, in order to cure the resin 4, the integrated product including the smoothing plate 33 and the glass substrate 2 is taken out of the pressing machine, and the UV-curable resin 4 is exposed to UV-rays 35 incident through the glass substrates 2. Then, the smoothing plate 33 is removed by a releasing tool (not shown) to leave an electrode plate 1 having metal electrodes 3 between which the UV-cured resin 4 is disposed.

As described above, according to the above-described embodiment of the present invention, an electrode plate 1 as shown in FIG. 1 is provided through an etching step wherein a coated substrate 2A including a glass substrate 2 coated successively with a nickel alloy adhesion layer 8, a copper layer 9 and a nickel alloy protective layer 10 and further provided with a photoresist pattern 13 carrying an electrode pattern is rotated at a high speed (of ca. 200–1000 rpm) whereby a downwardly sprayed etchant 23 is quickly liberated from the substrate 2 to uniformly etch the entire substrate surface, and metal electrodes can be formed with a good adhesion onto the glass substrate 2 and at a good accuracy to provide an electrode plate suitable for use in a liquid crystal device requiring an accuracy of μm order.

The filling of the spacing between the metal electrodes 3 with the cured UV-resin 4 is not essential, but the metal electrodes can remain as a projection on the glass substrate 2.

Next, a preferred embodiment of the liquid crystal device according to the present invention will be described.

Figure 7:
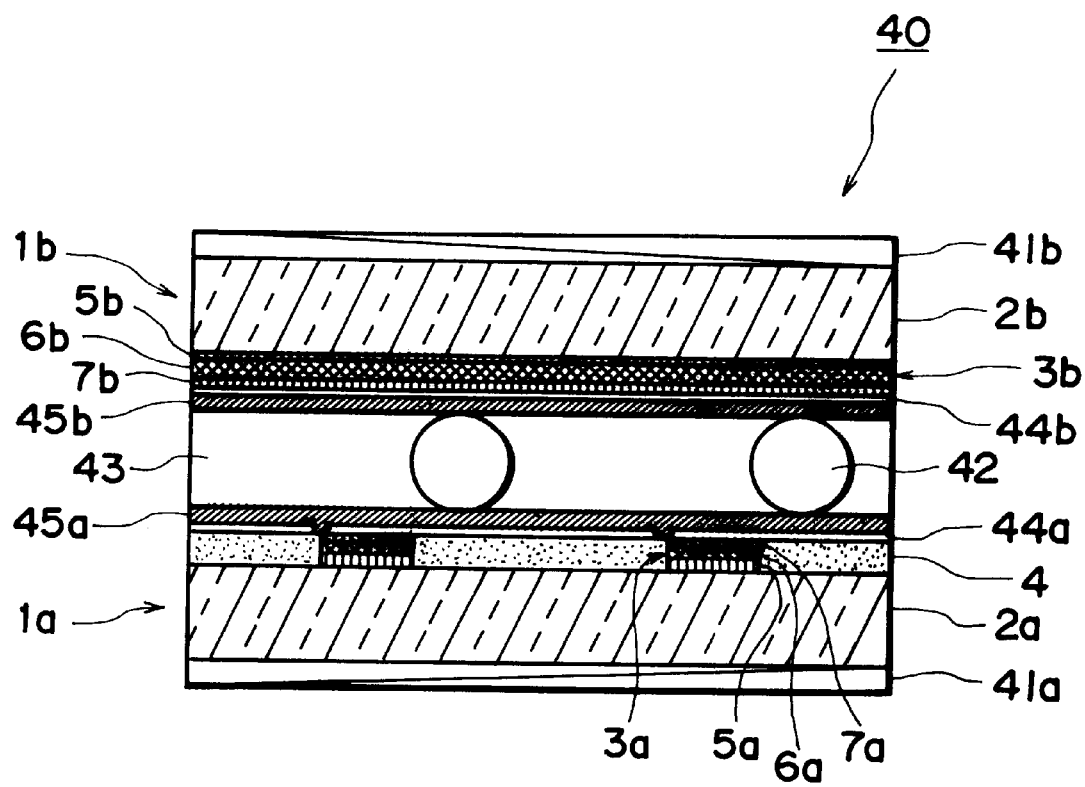
FIG. 7 is a schematic sectional view of a liquid crystal device including an embodiment of the electrode plate according to the invention.

FIG. 7 is a schematic sectional view of an embodiment of the liquid crystal device according to the present invention including an electrode plate as described above.

Referring to FIG. 7, a liquid crystal device 40 includes a pair of polarizers 41a, 41b, and a pair of electrode plates 1a, 1b disposed between the polarizers 41a, 41b. The electrode plates 1a, 1b are held to retain a prescribed gap (of, e.g., 1.5 µm) therebetween by means of spherical spacer beads 42, and the gap is filled with a chiral smectic liquid crystal 43.

The electrode plates 1a and 1b each have a structure similar to that of the electrode plate 1 shown in FIG. 1, including glass substrates 2a and 2b having thereon patterned metal electrodes 3a, 3b and a UV-cured resin 4 filling the spacings between the metal electrodes 3a (or 3b) so as to provide a flat surface together with the metal electrodes 3a, 3b. The metal electrodes 3a, 3b each have a three layer structure including adhesion layers 5a, 5b of nickel alloy, principal conductor layers 6a, 6b of copper and protective layers of nickel alloy.

In the metal electrodes 3a 3b, the adhesion layers 5a, 5b may have a thickness of, e.g., 30 nm, the principal conductor layers 6a, 6b may have a thickness of, e.g., 1 µm, and the protective layers 7a, 7b may have a thickness of, e.g., 15 nm. On the surfaces formed on the protective layers 7a, 7b and the UV-cured resin 4, transparent electrodes 44a and 44b of ITO (indium tin oxide) are formed in electrical connection with the metal electrodes 3a and 3b, respectively, and thereover alignment films 45a, 45b are formed. The transparent electrodes 44a, 44b are formed in stripes in alignment with the metal electrodes 3a, 3b so as to intersect each other at right angles to form an electrode matrix.

In the liquid crystal device 40 according to the present invention, as the adhesion layers 5a, 5b and the protective layers 7a, 7b of the metal electrodes 3a, 3b are formed of a nickel alloy, the principal conductor layers 6a, 6b of copper showing a poor adhesion onto glass substrates 21a, 2b are allowed to intimately adhere to the glass substrates 2a, 2b via the adhesion layers 5a, 5b.

Further, as the low-resistivity metal electrodes 3a, 3b are disposed below the transparent electrodes 44a, 44b, the delay in transmission of voltage waveforms along the transparent electrodes 44a, 44b can be suppressed to stably drive the chiral smectic liquid crystal 43, thus providing an improved display quality.

The protective layers 7a, 7b of the metal electrodes 3a, 3b may be formed in a small thickness (of, e.g., 15 nm as described above), the electrical resistances thereof are negligibly small, and the flatness between the metal electrodes 3a, 3b and the transparent electrodes 44a, 44b can be well retained.

The above-described liquid crystal device 40 may be produced through a process as described below with reference to FIGS. 8A–8E.

Glass substrates 2a, 2b may be provided with patterned metal electrodes 3a, 3b including adhesion layers 5a, 5b, principal conductor layers 6a, 6b and protective layers 7a, 7b and UV-cured resins 4a, 4b embedding the metal electrodes 3a, 3b in a similar manner as in the process for producing the electrode plate 1 described with reference to FIGS. 3–6, and details thereof are not repeated herein.

The processing of one electrode plate including glass substrate 2a will be described with reference to FIGS. 8A–8E.

Figure 8A:
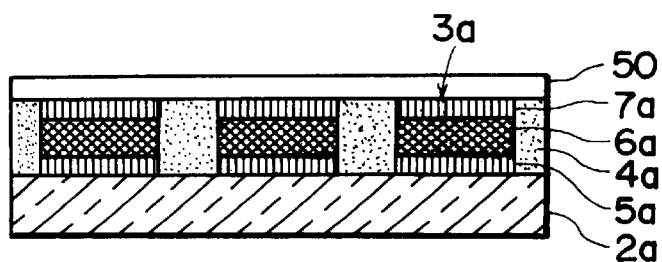
FIGS. 8A–8E are schematic sectional views or side illustrations for illustrating several steps involved in an embodiment of the process for producing a liquid crystal device according to the invention, including FIG. 8A showing a step of forming an ITO film over metal electrodes and a UV-cured resin, FIG. 8B showing a photoresist exposure step, FIG. 8C showing a state of photoresist layer functioning as an etching pattern for transparent electrodes, FIG. 8D showing a state of patterned transparent electrodes formed by etching, and FIG. 8E showing an alignment film formed over the patterned transparent electrodes.
Figure 8B:
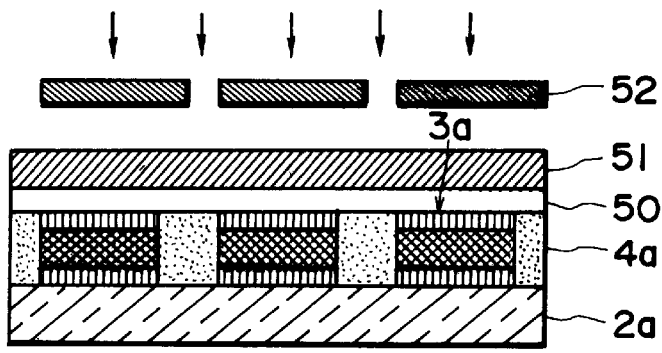

On the protective layers 7a of the metal electrodes 3a and the UV-cured resin 4 forming a flat surface, an ITO (indium tin oxide) layer 50 providing transparent electrodes is formed in a thickness of, e.g., ca. 700 Å by sputtering (FIG. 8A).

Figure 8C:
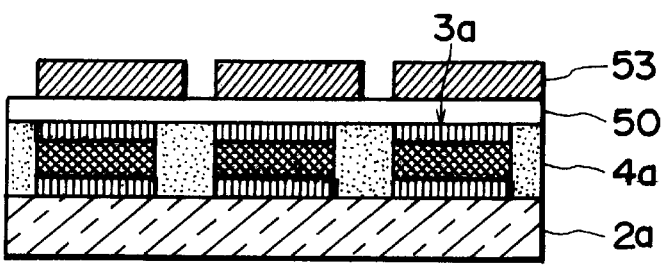

Then, the ITO layer 50 is coated with a layer of photoresist 51 in a thickness of, e.g., 2 µm by spin coating, and the photoresist layer 51 is exposed through a photomask 52 having an aperture corresponding to a prescribed electrode pattern (FIG. 8B), followed by developing and post-baking to provide an etching pattern 53 (FIG. 8C).

Figure 8D:
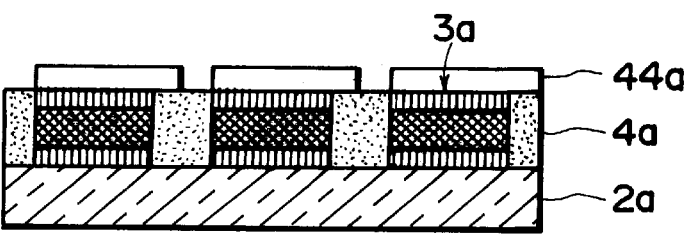

Then, the electrode plate provided with the etching pattern 53 is dipped within an etchant of hydroiodic acid to etch the portions of the ITO layer 50 exposed through the etching pattern, and then the etching pattern 53 is peeled off to leave patterned transparent electrodes 44 (FIG. 8D).

Figure 8E:
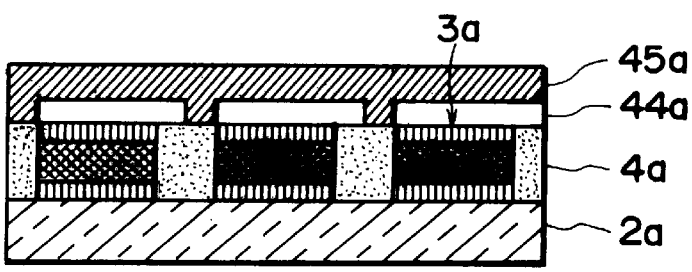

Then, the patterned transparent electrodes 44a are coated with an insulating layer (not shown), of, e.g., $Ta_2O_5$ in a thickness of ca. 900 Å by sputtering and then with a solution of a polyamic acid (e.g., "LQ 1800" (trade name), available from Hitachi Kasei K.K.) diluted to 1.5 wt. % in an NMP/nBC (=1/1) solution by spin coating at 2000 rpm for 20 sec., followed by baking for 1 hour under heating at 270° C., to form an, e.g., ca. 200 Å-thick alignment film 45a (FIG. 8E). The alignment film 45a is then subjected to rubbing.

The other electrode plate including the glass substrate 2a are similarly provided with transparent electrodes 44b and an alignment film 45b.

Then, spherical spacer beads 42 are dispersed on one substrate 2a (or 2b), and a sealing member (not shown) of e.g., epoxy resin, may be applied by flexography at a surface periphery of the other substrate 2b (or 2a). Thereafter, these substrates (electrode plates) are applied to each other so that the rubbing directions on the alignment films 45a, 45b are mutually parallel and identical directions, with a prescribed gap (of, e.g., 1.5 µm), which is then filled with a chiral smectic liquid crystal 43 to form a liquid crystal device 40 as shown in FIG. 7.

In the above-described process, as the protective layers 6a, 6b of nickel alloy are formed on the principal conductor layers 6a, 6b of copper of the metal electrodes 3a, 3b, the corrosion of the principal conductor layers 6a, 6b of copper with the etchant (e.g., hydroiodic acid) for patterning the ITO can be prevented during the etching step for providing the patterned transparent electrodes 44a, 44b, so that the liquid crystal device 40 can be provided with stable metal electrodes 3a, 3b.

In the liquid crystal device 40, the adhesion layers 5a, 5b and the protective layers 7a, 7b of the metal electrodes 3a, 3b may be formed of a nickel metal inclusive of nickel alloys, such as Ni—Mo alloy, Ni—Al alloy, Ni—Si alloy and Ni—Sn alloy, and also nickel single substance (Na).

Next, the process and apparatus for spin etching according to the second aspect of the present invention will be described with reference to drawings.

Figure 9:
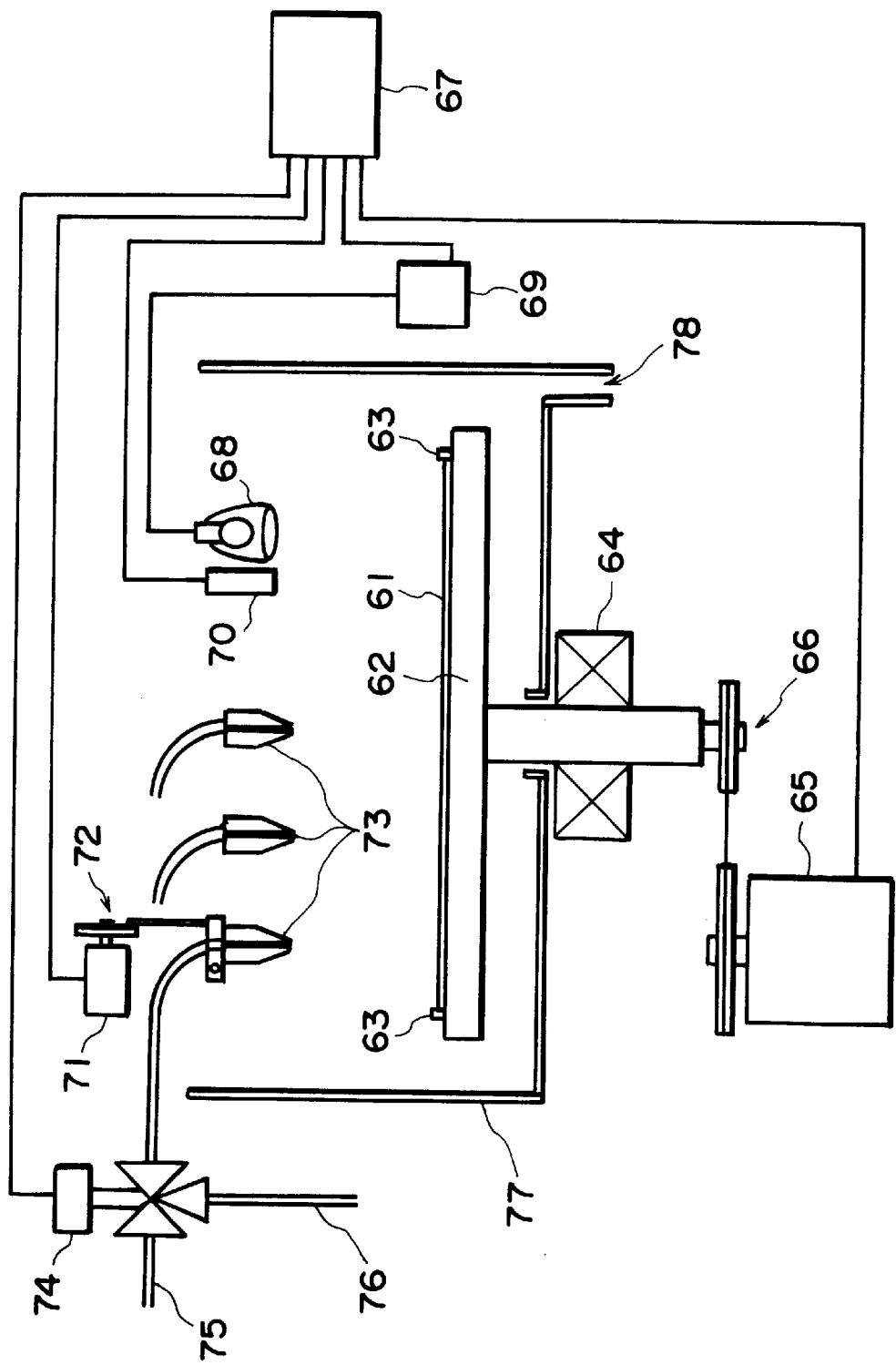
FIGS. 9 and 10 are respectively an illustration of a spin etching apparatus according to an embodiment of the invention.

FIG. 9 is an illustration of an embodiment of the spin etching system (process and apparatus) according to the present invention. Referring to FIG. 9, a substrate 61 to be etched is provided in a form comprising an Si substrate coated with a Cu film to be etched and a patterned resist carrying an etching pattern. The substrate 61 is fixed onto a rotatable holder 62 by means of substrate-fixing means 63, and the substrate holder 62 is rotatably affixed via a bearing 64 to a stand (not shown).

The apparatus further includes a holder motor 65 for rotating the substrate holder 62 carrying the substrate 61 via a power transmission device 66. The rotation speed of the holder motor 65 and accordingly also the rotation speed of the substrate 61 are designed to be controlled by a computer 67 as a control means. Further, the computer 67 also controls a lamp power supply 69 to supply electricity to and turn on a lamp 68, if the rotation speed of the substrate holder 62 becomes stable, thereby illuminating the surface of the substrate 61.

A photosensor 70 is disposed above the substrate holder 62 so as to detect a light quantity reflected from the illuminated substrate 61 surface and output a detection signal depending on the reflected light quantity to the computer. On receiving the detection signal from the photosensor 70, the computer 67 starts an etching motor 71 to rock nozzles 73 via a rocking cam 72 and actuate a changeover value 74 to open an etchant pipe 75, whereby the etchant from the pipe 75 is sprayed through the rocking nozzles 73 onto the substrate 61 surface. The etching motor 71, the nozzles 73 and the changeover valve 74 constitute an etchant spraying means.

The changeover valve 74 takes a closing position, a position for opening the etchant pipe 75 or a position for opening an etching rinse pipe 76 selectively depending on a signal from the computer 67. As described later, after completion of the etching, the valve 74 switches to the position for opening the etching rinse pipe 76 depending on a signal from the computer 67.

In this embodiment, the substrate holder 62 is formed of a light-intransmissive material so as to surely reflect light incident to the substrate 61 surface even when the Cu film becomes thin due to progress of the etching. The system further includes an etching vessel 77 equipped with a waste liquid discharge port 78.

When an etchant is sprayed onto the substrate 61 surface, the Cu film on the substrate 61 is etched with the etchant to finally expose the Si substrate surface therebelow, and correspondingly, the reflected quantity detected by the photosensor 70 increases. This is because the Cu film before the etching partially absorbs wavelength portions except for those in proximity to 60 nm, whereas the exposed Si surface after the etching provides a reflected light having a broader wavelength region than Cu.

When the etching of the Cu film is further proceeded at a portion exposed through the resist pattern to completely expose the Si substrate, i.e., when a so-called "just etched state" that the resist-free portion is fully etched is reached, the reflected light quantity detected by the photosensor 70 is saturated. Thereafter, the etching is principally proceeded as only side etching, i.e., etching of a portion of the Cu film hidden below the resist, so that the reflected quantity detected by the photosensor does not substantially change.

After the just etched state is reached, it is necessary to immediately terminate the spraying of the etchant and supply the rinse to the substrate surface to remove the etchant from the substrate, so as to avoid excessive thinning of the etching pattern due to the side etching.

Accordingly, when the saturation of reflected light quantity indicating the just etched state is detected via the photosensor 70, the computer 67 switches the changeover valve 74 to the etching rinse pipe 76 side position, thereby supplying the rinse to the rocking nozzles 73, through which the rinse is sprayed onto the substrate 61 surface. In this operation, the motor 71, the nozzles 73 and the changeover valve 74 constitute a washing liquid-spraying means. The computer 67 is designed to evaluate the reflected light quantity change as an average value of or an integrated value of changes obtained in a period of at least one rotation of the substrate holder.

The etching operation performed using the spin etching apparatus will now be described.

First, a substrate 61 to be etched is fixed onto the substrate holder 62 by means of the substrate-fixing means 63. Then, the computer 67 drives the holder motor 65 so as to rotate the substrate holder 62 via the power transmission device 66. Thereafter, when the rotation speed of the substrate holder 62 is stabilized, the lamp 68 is turned on to illuminate the substrate 61 surface, and the reflected light from the surface is detected by the photosensor 70, from which a signal is sent to the computer 67. On receiving the signal, the computer 67 actuates the etching motor 71 to rock the nozzles 73 via the rocking cam 72 and actuates the changeover valve 74 to open the etchant pipe 75.

As a result, the etchant is supplied through the pipe 75 and sprayed through the nozzles 73 onto the substrate 61 surface, whereby the Cu film on the substrate 61 is etched to expose the Si substrate therebelow. If the Si substrate appears at the surface, the light quantity detected by the photosensor 70 increases until the Cu film is etched faithfully to the resist pattern to reach a just etched state where the light quantity increase is saturated.

Then, when the saturation of the reflected light quantity is detected by the photosensor 70, the computer 67 switches the changeover valve 74 to the rinse pipe side 76 to open the rinse pipe 76, thereby spraying the rinse onto the substrate 61 surface. When the etchant on the substrate surface is sufficiently washed with the rinse, the changeover valve 74 is finally closed, the etching motor 71 is stopped and, after the sufficient removal of the rinse, the holder motor 67 is stopped to terminate the rotation of the substrate holder 62. Thus, the etching steps are completed.

In a specific example, a spin etching operation was performed in a manner substantially as described above and under the following specific conditions:

Si substrate: Circular, diameter: 8 inches, thickness: 1 mm, surface of (100) plane.

Cu film: 1 $\mu$m-thick,

Resist: 1 $\mu$m-thick, positive-type photoresist "OFPR-800" (trade name), made by Tokyo Ohka Kogyo K.K.

Etchant: Aqueous solution of ferric chloride (3.8%)+ ethylenethiourea (0.5%)

Etchant temp.: 35° C.

Substrate holder rotation speed: 700 rpm

Nozzle rocking frequency: 100 cycles/min.

Etchant ejection pressure: 1.3 kg/cm$^2$

Rinse time: 5 sec.

Rinse draining time: 10 sec.

If a substrate to be etched is illuminated with light and reflected light therefrom is detected by a photosensor 70 to monitor a progression state of etching, the progress of etching can be accurately evaluated and the terminal point of the etching can be detected on a real time basis.

In the above-described embodiment, the photosensor 70 is designed to detect the light quantity of entire reflected light. However, depending on the reflection characteristics of the film to be etched and the substrate, it is also possible to design the photosensor 70 so that a change in intensity at a specific wavelength or a change in spectrum pattern of reflected light is detected. Further, in case where a remarkable difference in reflection characteristic as between Cu and Si is not present for allowing control by reflected light quantity, it is possible to use a filter for restricting a wavelength for detecting a reflected light quantity so as to facilitate a discrimination between reflected lights from the film to be etched and the substrate.

In another preferred embodiment of the spin etching system according to the present invention, transmitted light is used for evaluation of etching state instead of reflected light as will be described hereinbelow.

Figure 10:
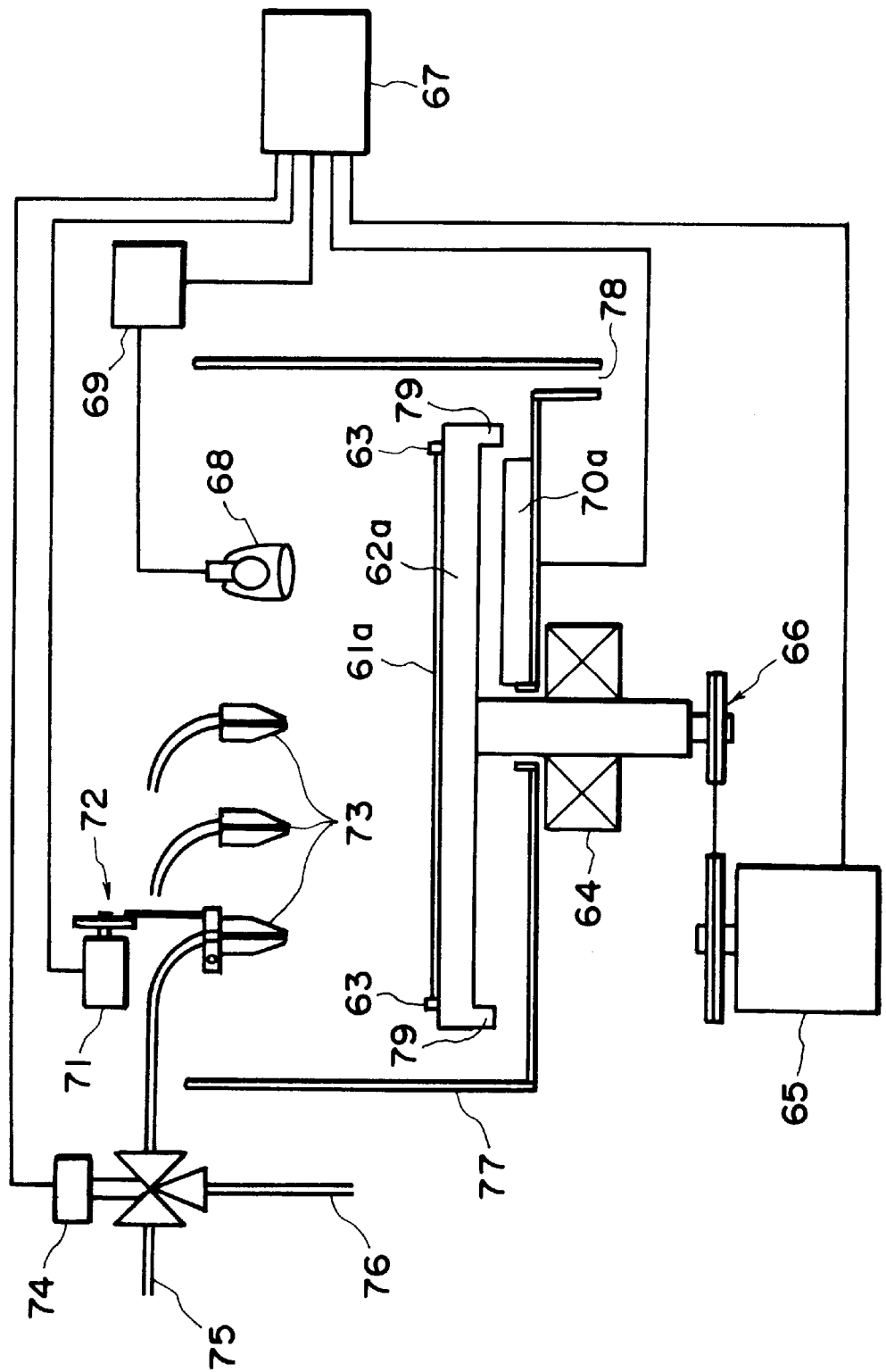
Figure 11:
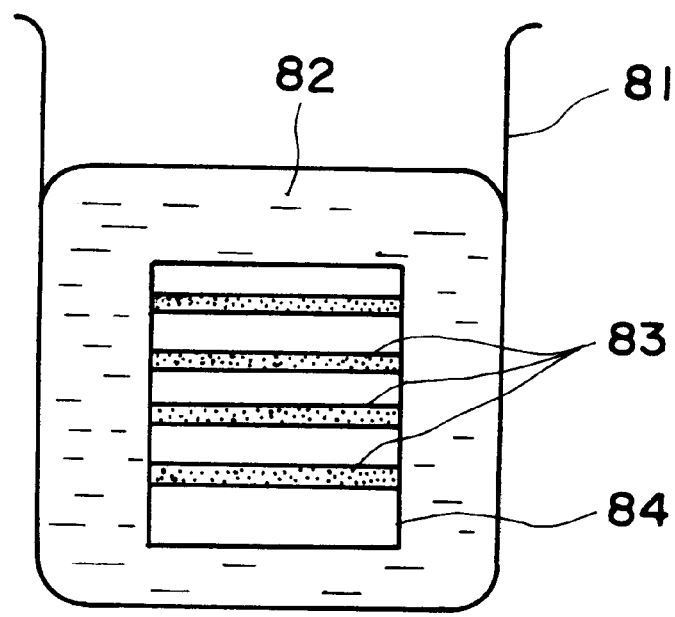
FIG. 11 is an illustration of a conventional wet etching process.
Figure 12:
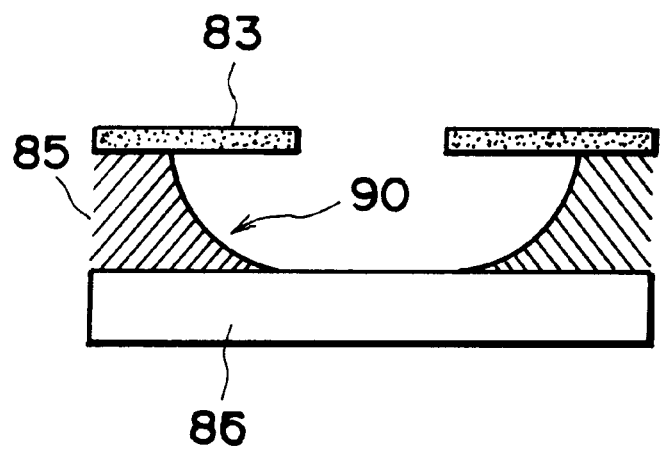
FIG. 12 is a schematic sectional view of a resultant etched substrate.
Figure 13:
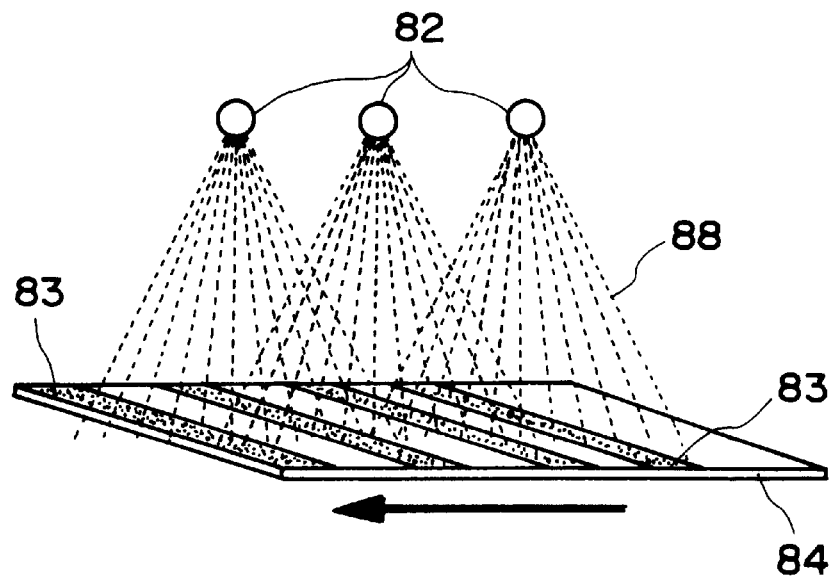
FIG. 13 is an illustration of a conventional wet etching process adopting the showering scheme.
Figure 14:
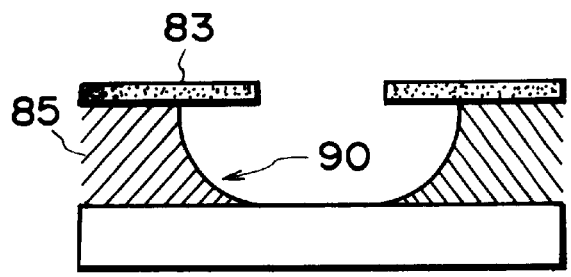
FIG. 14 is a schematic sectional view of a resultant etched substrate.
Figure 15:
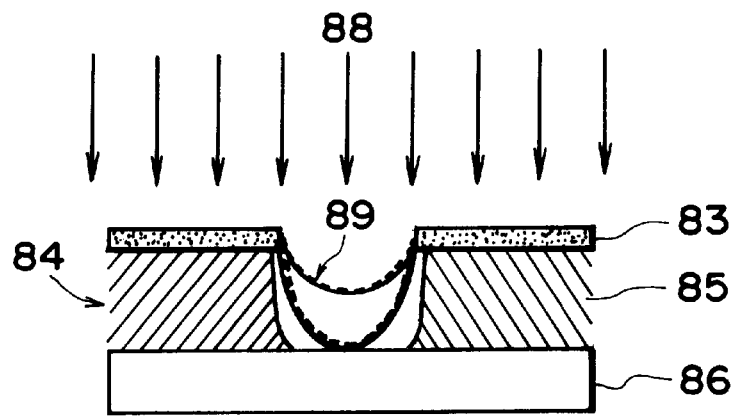
FIG. 15 is schematic side sectional illustration of a conventional wet etching process using a side protective film for preventing side etching.
Figure 16:
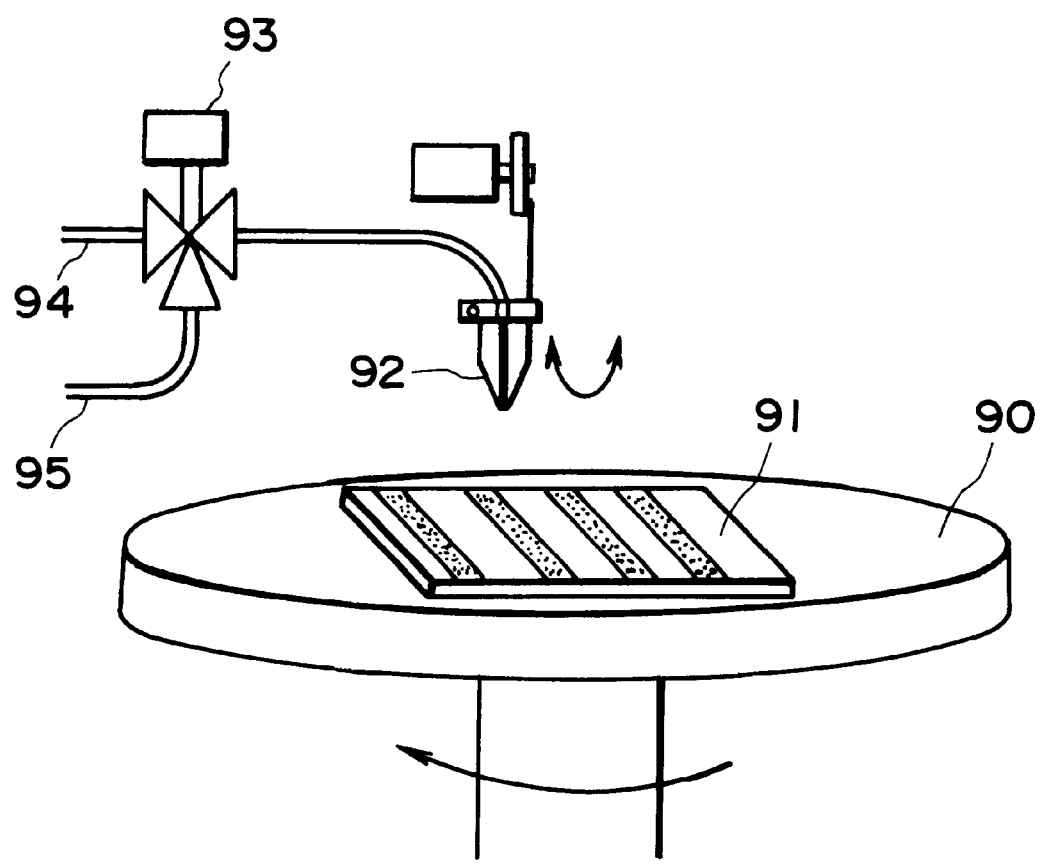
FIG. 16 is a perspective illustration of a conventional spin etching apparatus adopting the showering scheme.
Figure 17:
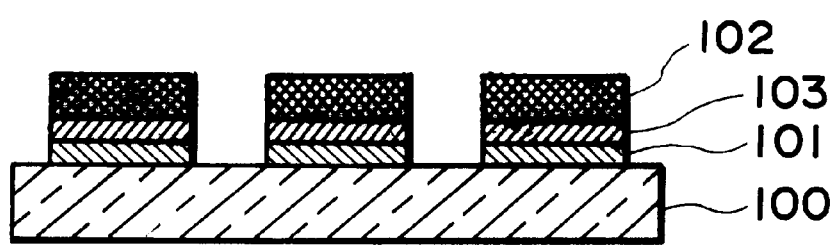
FIG. 17 is a schematic sectional illustration of an electrode plate carrying patterned laminate metal electrodes.

FIG. 10 is an illustration of a spin etching system according to the embodiment, wherein identical or like numerals are used for denoting identical or corresponding members.

Referring to FIG. 10, a substrate 61a to be etched is provided in a form comprising a glass substrate (as an example of light-transmissive substrate) coated with a Cu film as an opaque film to be etched and a patterned resist carrying an etching pattern. The substrate 61 is fixed onto a light-transmissive substrate holder 62a. Below the substrate holder 62a, a photosensor 70a is disposed.

The photosensor 70a is designed to detect light emitted from a lamp 68 disposed above the substrate holder 62a and transmitted through the substrate 61a carrying the Cu film having a thickness gradually decreasing with progress of etching and the substrate holder 62a. In this embodiment, the photosensor 70a is disposed closer to the substrate 61a than the photosensor 70 used in the embodiment of FIG. 9 and comprises a line sensor suited for such disposition. However, the photosensor 70a can be of any type as far as it can detect transmitted light.

In this embodiment, the substrate holder 62a is provided with a draining skirt 79 at its backside periphery so that the etchant is prevented from flowing to backside of the holder 62a and dropping onto the photosensor 70a.

On demand of the computer 67, a holder motor 65 is driven to rotate the substrate holder 62a and, when the rotation speed of the substrate holder 62a is stabilized, the lamp 68 is turned on and the etching motor 71 is driven to rock the etching nozzles 73 via the rocking cam 72. Further, the changeover valve 74 is actuated to open the etchant pipe 75. As a result, the etchant supplied through the etchant pipe 75 is ejected through the nozzles 73 under rocking and sprayed onto the substrate 61a.

As the etching proceeds and the Cu film becomes thinner, the transmitted light quantity detected by the photosensor 70a increases. However, after reaching a just etched state where portion of the Cu film exposed through the resist pattern is just fully etched, the transmitted light quantity increasing rate is remarkably decreased. This is because the transmitted light quantity through the substrate 61a increases at a large rate in a period when the portion to be etched of the Cu film exposed through the resist is etched, but the side etching after the just etched state does not substantially contribute to an increase in transmitted light quantity.

When the decrease in transmitted light quantity increasing rate is detected via the photosensor 70a, the computer 67 switches the changeover valve 74 to the etching rinse pipe 76 side position, thereby supplying the rinse to the rocking nozzles 73, through which the rinse is sprayed onto the substrate 61 surface.

The etching operation performed by using the spin etching apparatus will now be described.

First, a substrate 61a to be etched is fixed onto the substrate holder 62a by means of the substrate-fixing means 63. Then, the computer 67 drives the holder motor 65 so as to rotate the substrate holder 62a via the power transmission device 66. Thereafter, when the rotation speed of the substrate holder 62a is stabilized, the lamp 68 is turned on to illuminate the substrate 61a and the etching motor 71 is actuated to rock the nozzles 73 via the rocking cam 72 and actuates the changeover valve 74 to open the etchant pipe 75. As a result, the Cu film on the substrate 61a is etched and thinned so that the photosensor 70a commences to detect transmitted light. Then, as the etching proceeds to reach the just etched state, the transmitted light quantity increasing rate is decreased. When the decrease is detected by the photosensor 70a, the computer 67 switches the changeover valve 74 to the rinse pipe 76 side to open the rinse pipe 76, thereby spraying the rinse onto the substrate 61a surface.

When the etchant on the substrate 61a surface is sufficiently washed with the rinse, the changeover valve 74 is finally closed, the etching motor 71 is stopped and, after the sufficient removal of the rinse, the rotation of the substrate holder 62a is terminated. Thus, the etching steps are completed.

If a substrate to be etched is illuminated with light and transmitted light quantity change is detected by a photosensor 70a to monitor a progression state of etching, the progress of etching can be accurately evaluated.

In the above-described embodiment, the substrate holder 62a is composed of a light-transmissive material. However, the substrate holder 62a can also be composed of an opaque material by providing a local light transmissive portion, e.g., by cutting.

In the above embodiments, the etchant and the rinse (washing liquid) are designed to be all through the common nozzles 73 by switching of the changeover valve 74, but these liquids can also be supplied through separate pipes. However, in the latter case, it is possible that the etchant drops through the nozzle during the rinsing or washing step, so that these liquids are supplied through a common nozzle by a valve operation at a position upstream from the nozzle.

It is preferred to produce the electrode plate of the present invention described before by using the spin etching system according to the present invention.

EXAMPLE 1

An electrode plate having a sectional structure as shown in FIG. 1 was prepared as follows in a manner similarly as described above with reference to FIGS. 3 to 6.

A glass substrate 2 having planar sizes of 300×340 mm and a thickness of 1.1 mm was coated with a 30 nm-thick adhesion layer 8 of Ni—Mo alloy (Mo content=10% (atm. %)) giving a saturation magnetization of ca. 200–400 G, a 1 $\mu$m-thick principal conductor layer 9 of copper and then with a 15 nm-thick protective layer 10 of Ni—Mo alloy (Mo=10%), respectively by DC magnetron sputtering (FIG. 3A). The sputtering was performed by using an apparatus of "BCC-700" (trade name) available from Syncro K.K. respectively under the following conditions.

[Ni—Mo (Mo=10%) layer 8]
  Pressure=$5 \times 10^{-3}$ Torr
  Substrate temp.=200° C.
  Ar gas flow rate=100 sccm
  Target power=13 W/sec.
  Sputtering time=60 sec.

[Cu layer 9]
  Pressure=$5 \times 10^{-3}$ Torr
  Substrate temp.=200° C.
  Ar gas flow rate=100 sccm
  Target power=28 W/sec.
  Sputtering time=750 sec.

[Ni—Mo (Mo=10%) layer 10]
  Pressure=$5 \times 10^{-3}$ Torr
  Substrate temp.=200° C.
  Ar gas flow rate=100 sccm
  Target power=13 W/sec.
  Sputtering time=30 sec.

Then, a photoresist ("OFPR-800" (trade name) made by Tokyo Ohka Kogyo K.K.) was applied onto the glass substrate 2 carrying the metal layers 8–10 by spin coating to form a 2 $\mu$m-thick photoresist layer 11, which was then exposed through a photomask 12 carrying an electrode pattern, developed and post-baked to form an etching pattern (FIGS. 3B and 3C).

Then, the metal layers 8–10 laminated on the glass substrate 2 were etched by using an etching apparatus 20 as shown in FIG. 4 under the following conditions:

Etchant=ferric chloride aqueous solution (9.5%)
Nitrogen pressure=1.2 kg/cm$^2$
Rinse=pure water
Substrate rotation speed=400 rpm
Etchant temp.=25° C.
Etching time=20 sec.
Rinse time=60 sec.
Water draining time=30 sec.
Etchant spreading angle=50 deg.
Nozzle rocking angle=60 deg.
Nozzle rocking frequency=100 cycles/min.

Then, the etching pattern was peeled from the coated and etched substrate to form an electrode plate including a glass substrate 2 and stripe metal electrodes 3 of a laminate structure including Ni—Mo (10%) adhesion layer 5, a Cu principal conductor layer 6 and a Ni—Mo (10%) protective layer 7. The stripe metal electrodes were formed in a width of 20 μm each at a pitch of 320 μm.

After the etching, the metal electrodes 3 were embedded within a UV-cured resin 4 in a manner substantially as described with reference to FIGS. 6A–6E. As a result, an electrode plate having a sectional structure as illustrated in FIG. 1 was prepared with an electrode pattern free from etching irregularity.

Separately, the above-described etching operation was repeated by lowering the substrate rotation speed to 50–200 rpm. As a result, the ferric chloride aqueous solution 23 sprayed onto the substrate 2 surface could not be quickly liberated to result in etching irregularity, so that it was impossible to form metal electrodes at a good accuracy.

EXAMPLE 2

An electrode plate having a sectional structure as shown in FIG. 1 was prepared in a similar manner as in Example 1 except that the adhesion layer 5 and the protective layer 7 were formed from a nickel-aluminum (20%) alloy providing a saturation magnetization of ca. 200–400 G. The metal layers 5 to 7 were formed by DC magnetron sputtering similarly as in Example 1 but under the following conditions.

[Ni—Al (20%) layer 5]
Pressure=5×10$^{-3}$ Torr
Substrate temp.=200° C.
Ar gas flow rate=100 sccm
Target power=13 W/sec.
Sputtering time=50 sec.

[Cu layer 6]
Pressure 5×10$^{-3}$ Torr
Substrate temp.=200° C.
Ar gas flow rate=100 sccm
Target power=28 W/sec.
Sputtering time=750 sec.

[Ni—Al (20%) layer 7]
Pressure=5×10$^{-3}$ Torr
Substrate temp.=200° C.
Ar gas flow rate=100 sccm
Target power=13 W/sec.
Sputtering time=25 sec.

The etching of the Ni—Al, Cu and Ni—Al layers was performed by using the etching apparatus 20 shown in FIG. 4 in a similar manner as in Example 1 but under the following conditions:

Etchant=ferric chloride aqueous solution (9.5%)
Nitrogen pressure=1.2 kg/cm$^2$
Rinse=pure water
Substrate rotation speed=400 rpm
Etchant temp.=25° C.
Etching time=18 sec.
Rinse time=60 sec.
Water draining time=30 sec.
Etchant spreading angle=50 deg.
Nozzle rocking angle=60 deg.
Nozzle rocking frequency=100 cycles/min.

After the etching, the metal electrodes 3 were embedded within a UV-cured resin in the same manner as in Example 1 to form an electrode plate as shown in FIG. 1. The electrode plate thus prepared was found to have an electrode pattern free from etching irregularity similarly as in Example 1.

EXAMPLE 3

An electrode plate having a sectional structure as shown in FIG. 1 was prepared in a similar manner as in Example 1 except that the adhesion layer 5 and the protective layer 7 were formed from a nickel-silicon (15%) alloy providing a saturation magnetization of ca. 200–400 G. The metal layers 5 to 7 were formed by DC magnetron sputtering similarly as in Example 1 but under the following conditions.

[Ni—Si (15%) layer 5]
Pressure=5×10$^{-3}$ Torr
Substrate temp.=200° C.
Ar gas flow rate=100 sccm
Target power=13 W/sec.
Sputtering time=60 sec.

[Cu layer 6]
Pressure=5×10$^{-3}$ Torr
Substrate temp.=200° C.
Ar gas flow rate=100 sccm
Target power=28 W/sec.
Sputtering time=750 sec.

[Ni—Si (15%) layer 7]
Pressure=5×10$^{-3}$ Torr
Substrate temp.=200° C.
Ar gas flow rate=100 sccm
Target power=13 W/sec.
Sputtering time=30 sec.

The etching of the Ni—Si, Cu and Ni—Si layers was performed by using the etching apparatus 20 shown in FIG. 4 in a similar manner as in Example 1 but under the following conditions:

Etchant=ferric chloride aqueous solution (9.5%)
Nitrogen pressure=1.2 kg/cm$^2$
Rinse=pure water
Substrate rotation speed=400 rpm
Etchant temp.=25° C.
Etching time=40 sec.
Rinse time=60 sec.

Water draining time=30 sec.

Etchant spreading angle=50 deg.

Nozzle rocking angle=60 deg.

Nozzle rocking frequency=100 cycles/min.

After the etching, the metal electrodes 3 were embedded within a UV-cured resin in the same manner as in Example 1 to form an electrode plate as shown in FIG. 1. The electrode plate thus prepared was found to have an electrode pattern free from etching irregularity similarly as in Example 1.

EXAMPLE 4

An electrode plate having a sectional structure as shown in FIG. 1 was prepared in a similar manner as in Example 1 except that the adhesion layer 5 and the protective layer 7 were formed from a nickel-Sn (20%) alloy providing a saturation magnetization of ca. 20–400 G. The metal layers 5 to 7 were formed by DC magnetron sputtering similarly as in Example 1 but under the following conditions.

[Ni—Sn (20%) layer 5]

Pressure=$5\times10^{-3}$ Torr

Substrate temp.=200° C.

Ar gas flow rate=100 sccm

Target power=13 W/sec.

Sputtering time=50 sec.

[Cu layer 6]

Pressure=$5\times10^{-3}$ Torr

Substrate temp.=200° C.

Ar gas flow rate=100 sccm

Target power=28 W/sec.

Sputtering time=750 sec.

[Ni—Sn (20%) layer 7]

Pressure=$5\times10^{-3}$ Torr

Substrate temp.=200° C.

Ar gas flow rate=100 sccm

Target power=13 W/sec.

Sputtering time=25 sec.

The etching of the Ni—Sn, Cu and Ni—Sn layers was performed by using the etching apparatus 20 shown in FIG. 4 in a similar manner as in Example 1 but under the following conditions:

Etchant=ferric chloride aqueous solution (9.5%)

Nitrogen pressure=1.2 kg/cm$^2$

Rinse=pure water

Substrate rotation speed=400 rpm

Etchant temp.=25° C.

Etching time=15 sec.

Rinse time=60 sec.

Water draining time=30 sec.

Etchant spreading angle=50 deg.

Nozzle rocking angle=60 deg.

Nozzle rocking frequency=100 cycles/min.

After the etching, the metal electrodes 3 were embedded within a UV-cured resin in the same manner as in Example 1 to form an electrode plate as shown in FIG. 1. The electrode plate thus prepared was found to have an electrode pattern free from etching irregularity similarly as in Example 1.

In the above-described Examples, the adhesion layer 5 and the protective layer 7 of the metal electrodes 3 were formed of nickel alloys (Ni—Mo, Ni—Al, Ni—Si and Ni—Sn) but can also be formed from nickel single substance. In this case, however these layers have to be formed by a sputtering process other than DC magnetron sputtering.

As described above, the electrode plate according to the present invention is prepared by forming on a substrate a multi-layer metal electrode including a principal conductor layer of copper and an adhesion layer of nickel metal (alloy or single substance) disposed between the substrate and the principal conductor layer, so that the principal conductor layer of copper showing a poor adhesion onto the substrate is allowed to intimately adhere to the substrate via the adhesion layer.

The electrode plate may preferably be prepared by a process including a step of etching such a multi-layer metal electrode-forming film formed on a substrate by spraying an etchant downwardly and uniformly onto the substrate while rotating the substrate at a rotation speed sufficient to allow quick liberation of the etchant from the substrate. As a result, the electrode-forming laminate film can be etched uniformly without irregularity or etching speed difference between the edge portion and the central portion of the substrate to provide the laminate electrodes at a good pattern etching accuracy and a good adhesion to the substrate.

The liquid crystal device according to the present invention may be prepared by incorporating the above-described electrode plate of the present invention as at least one of a pair of electrode plates sandwiching a liquid crystal and, because of the metal electrodes accurately formed with a good adhesion onto the substrate and providing an improved electroconductivity onto transparent electrodes formed thereon, can effectively prevent the transmission delay and rounding of voltage waveforms even formed in a large size.

Further, according to the spin etching system of the present invention, a substrate to be etched is illuminated with light and the progress of etching is monitored by detecting a change in light quantity or spectrum pattern of reflected light or transmitted light from the substrate, whereby the termination of the etching can be accurately evaluated to accomplish a better etching performance. Further, as the etching termination can be accurately evaluated, the etchant deterioration tolerance can be broadened to reduce the consumption of the etchant, so that the environmental pollution by disposition of waste etchant can be also minimized.

What is claimed is:

1. A liquid crystal device, comprising:

a pair of substrates and a liquid crystal disposed between the substrates, at least one of the substrates comprising an electrode plate including a substrate and a plurality of patterned electrodes formed on the substrate, wherein each patterned electrode has a laminate structure including a first layer of nickel metal formed on the substrate, a second layer of copper formed on the first layer and a third layer of nickel metal formed on the second layer.

2. A liquid crystal device according to claim 1, wherein said first layer comprises a nickel alloy.

3. A liquid crystal device according to claim 2, wherein said nickel alloy is an alloy of nickel with at least one element selected from the group consisting of molybdenum, aluminum, silicon and tin.

4. A liquid crystal device according to claim 2, wherein said nickel alloy is substantially non-magnetizable.

5. A liquid crystal device according to claim 2, wherein said nickel alloy has a saturation magnetization of at most 1000 G.

6. A liquid crystal device according to claim 1, wherein a spacing between the patterned electrodes is filled with a polymeric material.

7. A liquid crystal device according to claim 6, wherein said polymeric material comprises an ultraviolet ray-cured resin.

8. A liquid crystal device according to claim 1, wherein said electrode plate further includes a plurality of transparent electrodes each formed on and electrically connected with at least one of the patterned metal electrodes.

9. A liquid crystal device according to claim 1, wherein said liquid crystal is a chiral smectic liquid crystal.

* * * * *

UNITED STATES PATENT AND TRADEMARK OFFICE
CERTIFICATE OF CORRECTION

PATENT NO.    : 6,106,907
DATED         : August 22, 2000
INVENTOR(S)   : Toshiaki Yoshikawa et al.

It is certified that error appears in the above-identified patent and that said Letters Patent is hereby corrected as shown below:

Title page,
Item [56], OTHER PUBLICATIONS, the following Copending Applications should be deleted; "U.S. application No. 08/814,318, Kameyama et al., filed Mar. 1997; U.S. application No. 08/899,057, Ishikura et al., filed Jul. 1997."

Column 5,
Line 6, "be" (second occurrence) should be deleted;
Line 23, "than" should read -- to --;

Column 6,
Line 37, "objects" should read -- objects, --;

Column 8,
Line 14, "can show a practical etching speed" should be deleted; (2nd occurrence)
Line 41, "descried" should read -- described --;

Column 9,
Line 37, "an" should read -- a --;
Line 38, "an" should read -- a --;

Column 11,
Line 15, "3a 3b," should read -- 3a, 3b, --;
Line 31, "21a, 2b" should read -- 21a, 21b --.

Signed and Sealed this

Twenty-first Day of October, 2003

JAMES E. ROGAN
*Director of the United States Patent and Trademark Office*